(12) United States Patent
Cho

(10) Patent No.: US 8,032,925 B2
(45) Date of Patent: Oct. 4, 2011

(54) METHOD FOR ENABLING LOGIN AND ESTABLISHING SESSION FOR WIRELESS COMMUNICATION TERMINAL

(75) Inventor: Eunjung Cho, Anyang-si (KR)

(73) Assignee: LG Electronics Inc., Seoul (KR)

( * ) Notice: Subject to any disclaimer, the term of this patent is extended or adjusted under 35 U.S.C. 154(b) by 1177 days.

(21) Appl. No.: 11/798,436

(22) Filed: May 14, 2007

(65) Prior Publication Data

US 2007/0266425 A1    Nov. 15, 2007

(30) Foreign Application Priority Data

May 15, 2006  (KR) ........................ 10-2006-0043403

(51) Int. Cl.
*H04L 29/06* (2006.01)
(52) U.S. Cl. .............................................. 726/3; 726/4
(58) Field of Classification Search .................. 713/182, 713/183, 247; 380/247–249
See application file for complete search history.

(56) References Cited

U.S. PATENT DOCUMENTS

| 6,035,404 A * | 3/2000 | Zhao ................................. 726/6 |
| 2002/0174236 A1* | 11/2002 | Mathur et al. ................. 709/229 |
| 2003/0046589 A1* | 3/2003 | Gregg ............................ 713/201 |
| 2004/0268156 A1* | 12/2004 | Sakakibara et al. .......... 713/202 |
| 2005/0177732 A1* | 8/2005 | Flom et al. ..................... 713/182 |

* cited by examiner

*Primary Examiner* — Minh Dinh
*Assistant Examiner* — David Le
(74) *Attorney, Agent, or Firm* — Birch, Stewart, Kolasch & Birch, LLP

(57) ABSTRACT

A method and terminal for enabling a login, and a method for establishing a session with a specific object, are discussed. According to an embodiment, the method includes: if a first client logs in to the service server using user authentication information and then a second client requests a login to the service server, checking whether the first client is logged out from the service server; and if the checking step indicates that the first client is logged out from the service server, enabling the second client to be logged in to the service server.

15 Claims, 6 Drawing Sheets

METHOD FOR ENABLING LOGIN AND ESTABLISHING SESSION FOR WIRELESS COMMUNICATION TERMINAL

CROSS-REFERENCE TO RELATED APPLICATIONS

The present application claims priority to Korean Patent Application No. 10-2006-0043403, filed in Korea on May 15, 2006, the entire contents of which are incorporated herein by reference.

BACKGROUND OF THE INVENTION

1. Field of the Invention

This document relates to a method for enabling a mobile communication terminal to provide a login for a specific service and to establish a session with a specific object, and relates to a mobile terminal for automatically performing a login operation.

2. Description of the Related Art

With a combination of a mobile communication service and an internet service, a user could search for various internet information and e-mail messages and use various multimedia contents such as music and image, by accessing a wireless internet through a mobile communication terminal with built-in Wireless Application Protocol (WAP)/Mobile Explorer (ME) browser while moving.

Peer-to-Peer (P2P) communication such as an instant messenger (hereafter, referred to as "IM"), which has been used by a wired internet connection, has been also provided to the mobile communication terminal via a wireless internet network.

However, in order to provide the wireless internet connection or perform the P2P communication, a session between a user agent (typically, a wireless communication terminal) and a peer (typically, a server) should be established. Specially, a specific server requests authentication in order to access a specific service through a user login prior to establishing the session.

When the wireless communication terminal has logged in to the specific server using user authentication information, if another client requests a login using the same authentication information (i.e., the same user ID) as the wireless communication terminal the wireless communication terminal is forced to log-out and the process ends.

Accordingly, there is a need to effectively enable a re-login whenever the user of the mobile communication terminal accesses the server's service, if another client is logged out.

SUMMARY

Accordingly, the present invention has been made to address the above-mentioned and other problems and limitations occurring in the related art.

Additional advantages, objects and features of the invention will be set forth in part in the description which follows and in part will become apparent to those having ordinary skill in the art upon examination of the following or may be learned from practice of the invention.

According to an aspect of the present invention, there is provided a method for enabling a login for a wireless communication terminal, comprising: if a first client logs into a service server using user authentication information, and then a second client logs into the service server, checking whether the first client is logged out from the service server, where the service server provides a specific service to a user; and if the first client is logged out from the service server, enabling a second client to be logged into the service server.

According to another aspect of the present invention, the method further comprises, if the second client logs into the service server using the same user authentication information as the first client, logging out the first client from the service server.

According to another aspect of the present invention, there is provided a method for establishing a session of a wireless communication terminal, comprising: if a first client logs into a service server using user authentication information, and then a second client logs into the service server using the same user authentication as the first client, logging out the first client from the service server; and if the second client is logged out from the service server, establishing a session with the service server.

According to an aspect of the present invention, there is provided a method for enabling a login in a communication system including a service server for providing at least one service to a user, the method comprising: if a first client logs in to the service server using user authentication information and then a second client requests a login to the service server, checking whether the first client is logged out from the service server; and if the checking step indicates that the first client is logged out from the service server, enabling the second client to be logged in to the service server.

According to an aspect of the present invention, there is provided a method for establishing a session with a service server, the method comprising: if a first client logs in to the service server using user authentication information, and then a second client logs in the service server using the same user authentication as the first client, logging out the first client from the service server; and if the first client is logged out from the service server, automatically establishing a session between the second client and the service server.

According to an aspect of the present invention, there is provided a method for performing a login operation in a communication system, the communication system including a service server, a mobile terminal and a computer, wherein a user can log in to the service server through each of the mobile terminal and the computer using same user identification information, and the service server provides at least one service to the user, the method comprising: receiving, by the mobile terminal, logging related information of the computer; determining, by the mobile terminal, whether the computer is logged out from the service server based on the received logging related information; and automatically logging in, by the mobile terminal, to the service server if the determining step determines that the computer is logout out from the service server.

According to an aspect of the present invention, there is provided a mobile terminal for performing a login operation in a communication system including a service server, the mobile terminal and a computer, wherein a user can log in to the service server through each of the mobile terminal and the computer using same user identification information, and the service server provides at least one service to the user, the mobile terminal comprising: a controller to receive logging related information of the computer, to determine whether the computer is logged out from the service server based on the received logging related information, and to automatically log in to the service server if the controller determines that the computer is logout out from the service server.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above aspects of the present invention will be more apparent by describing certain exemplary embodiments of the present invention with reference to the accompanying drawings, in which.

DETAILED DESCRIPTION OF THE PREFERRED EMBODIMENTS

Figure 1:
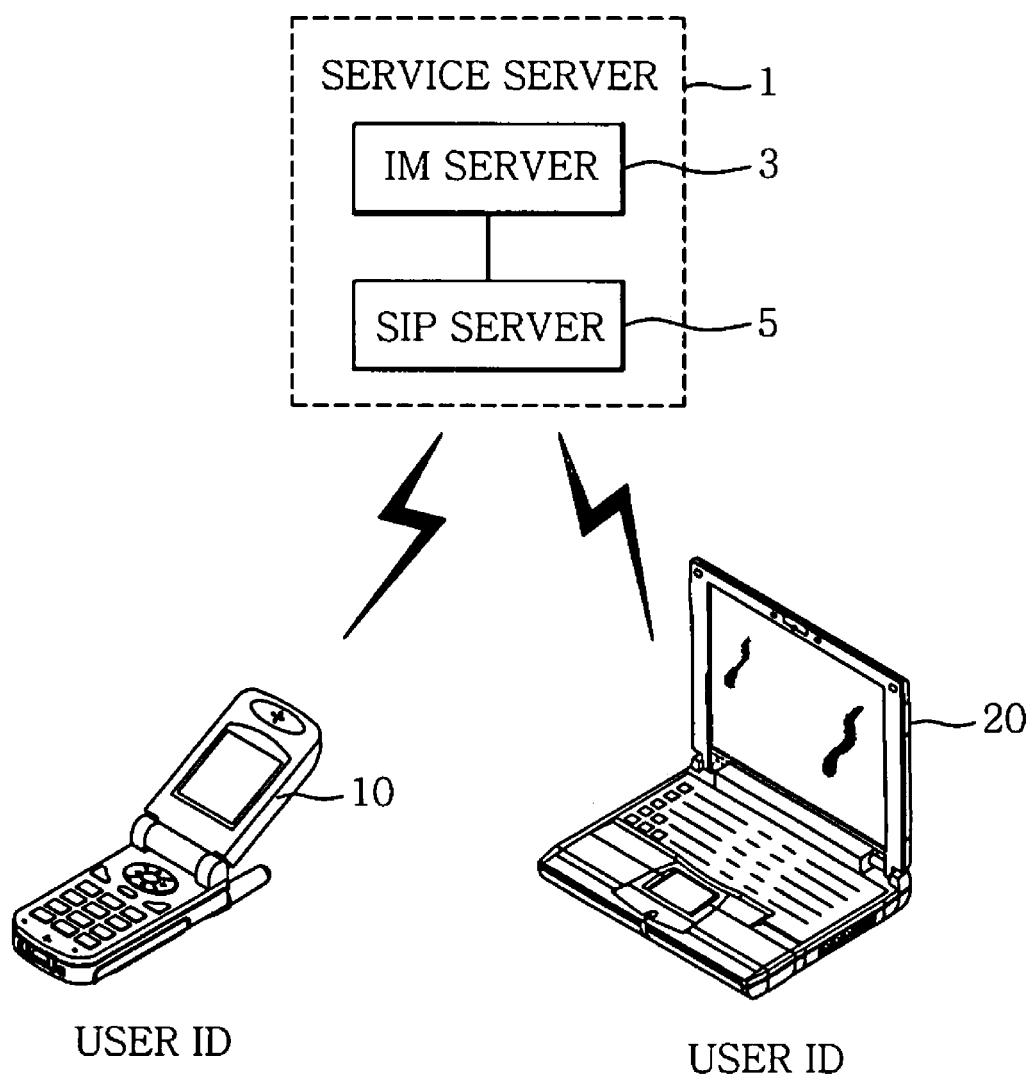
FIG. 1 is an overview diagram illustrating a communication network system where a multi-login is enabled according to an exemplary embodiment of the present invention.

Hereinafter, exemplary embodiments of the present invention will be described in detail with reference to the accompanying drawings. The aspects and features of the present invention ad methods for achieving the aspects and features will be apparent by referring to the embodiments to be described in detail with reference to the accompanying drawings. However, the present invention is not limited to the embodiments disclosed hereinafter, but can be implemented in diverse forms.

The matters defined in the description, such as the detailed construction and elements, are nothing but specific details provided to assist those of ordinary skill in the art in a comprehensive understanding of the invention, and the present is only defined within the scope of the appended claims. In the entire description of the present invention, the same drawing reference numerals are used for the same elements across various figures.

FIG. 1 is an overview diagram illustrating a communication network, where a multi-login is enabled, according to an exemplary embodiment of the present invention.

Referring to FIG. 1, it is shown that a user using an instant messenger (IM) service accesses an IM server 3 through a plurality of client devices 10 and 20 using one user ID.

An instant messenger is client software that, if a friend registered by the user logs on the communication network, informs the user of the friend's logon so that the user and his/her friend can send and receive messages. If the user uses the IM service by accessing the IM server through an IM program, it is not necessary to execute a separate browser. If the user selects his/her friend of on-line state through the user's other client terminal (e.g., personal computer (PC) or wireless communication terminal), the user can enjoy the 1:1 chatting as well as multiple chatting with his/her friend using the IM service.

A service server 1 for providing the IM service and possibly other services comprises the IM server 3 for providing a presence service indicating an on-line friend list and state, and a Session Initiation Protocol (SIP) server 5 for routing messaging between each user and the IM server 3. The user can use the IM service by installing the IM program in the user's client devices such as the wireless communication terminal 10 and computer 20.

Accordingly, the IM service can continuously be used by accessing the IM server 3 through the IM software installed on the computer 20 while the user is using a wire internet service, and accessing the IM server 3 through the wireless communication terminal 10 while the user is moving.

The IM server 3 is the server for providing the instant messenger service such as MSN, IRC, ICQ, and others. The IM server 3 divides all subscriber users into user identifiers, manages an access state, a receiving mode, the friend list and environment setup information of each user, and transfers the messages between on-line users.

A session initiation protocol (SIP) is a signaling protocol of an application layer used for identifying one or more terminals that try to communicate on the internet in order to search for their location; and creating, modifying and terminating communication sessions for IP based messaging services.

The SIP uses a SIP URL similar to an email address in order to divide each user, and thus can provide a service, independent of the IP. Accordingly, the SIP server 5 relays the SIP messages including a command and/or a telegraphic sentence for providing the IM service between the client devices 10 and 20 and the IM server 3, to perform a proxy function of the wireless communication network on the internet.

According to the embodiment of the present invention, the user accesses the service server 1 through the client devices such as the wireless communication terminal 10 and the computer 20, and checks whether the user's friend is in an on-line state. If the user's friend is in the on-line state, the user can send messages to that friend using the client devices 10, 20.

Particularly, the user can log in to the service server 1 using a user ID through the client devices 10 and 20 with built-in IM program(s). However, when the user logs into the service server 1 through the client device 20 after having first logged into the server 1 through the client device 10, the client device 10 is forced to log out from the service server 1 because the same user ID is used and multiple client devices may not be simultaneously logged in using one same user ID. The user ID can be any data or information that identifies the user. Accordingly, if the client device (i.e., wireless communication terminal) 10 is forced to log out from the IM server 3, the user periodically checks whether the other client device (i.e., personal computer) 20 is logged out from the IM server 3. If the checking indicates that the client device 10 is logged out, the client device 20 tries to log into the IM sever 3 again using the same user ID of the user.

In this example, the client device 20 is a personal computer or notebook, but is not limited thereto, and may be various wired or wireless terminals, for example, a handheld computer, a cellular phone, a PDA, a smart phone, etc., all of which can access the service server 1 through the communication network shown in FIG. 1. Also the client device 10 in this example is a mobile communication terminal such as a cellular phone, a PDA, a smart phone, a pager, etc. In other examples, any client device can be a mobile terminal, a notebook, a personal computer, etc.

Figure 2:
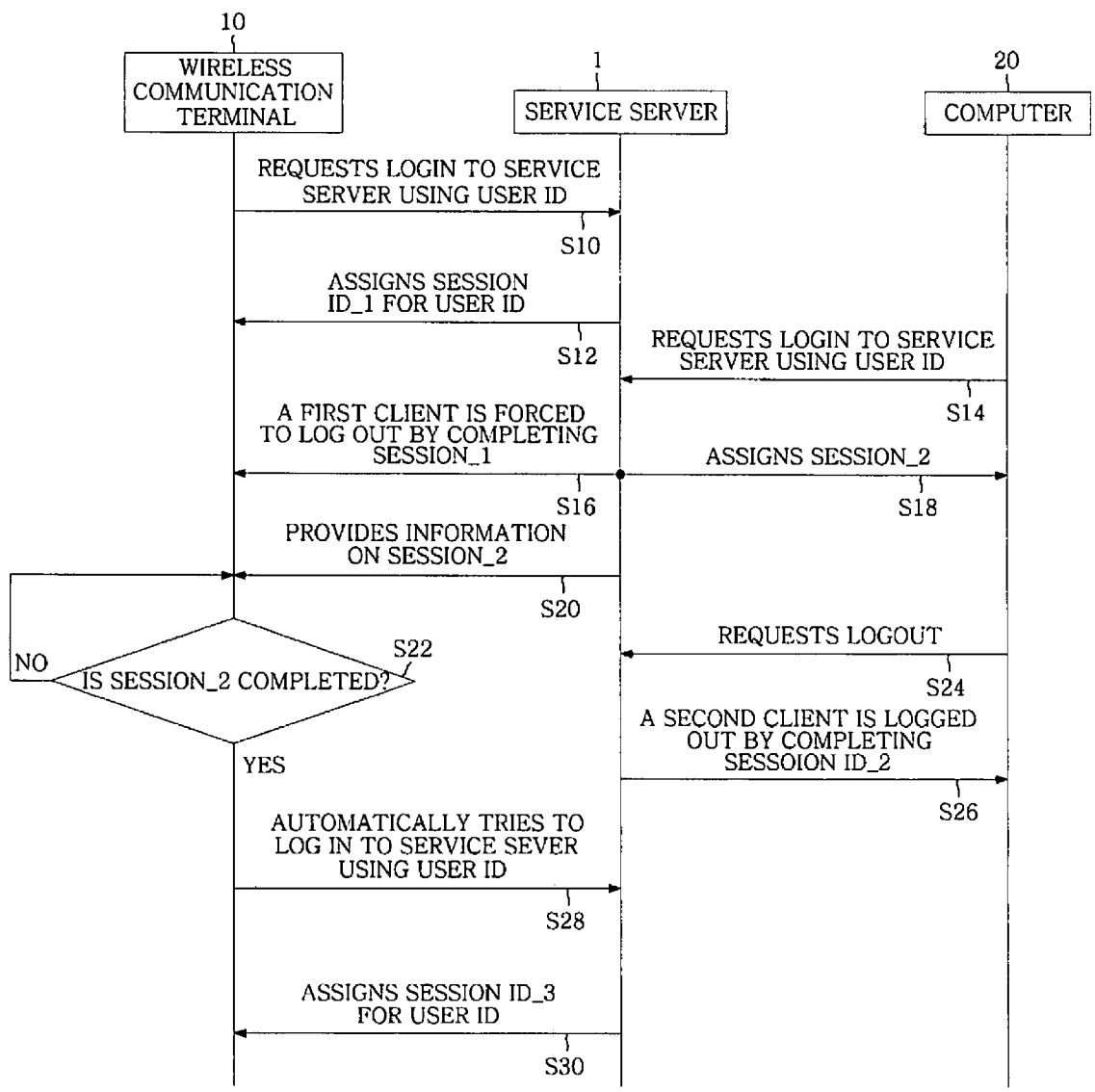
FIG. 2 is a flowchart illustrating a process for enabling a login of a wireless communication terminal in the communication network system of FIG. 2 according to an exemplary embodiment of the present invention.

FIG. 2 is a flowchart illustrating a process for enabling a login for the wireless communication terminal 10 through the communication network of FIG. 1 according to an exemplary embodiment of the present invention. The process of FIG. 2 is implemented in the system of FIG. 1, but can be implemented in other suitable system. Here, a user can login to the service server 1 using the user's unique ID information (and password or the like) through the plurality of client devices 10, 20, etc.

Referring to FIG. 2, according to the user's selection of the IM service, the wireless communication terminal 10 executes the IM program and sends user authentication information such as a user ID and a password to the service server 1 to request a login (S10).

The service sever 1 performs an authentication procedure for the wireless communication terminal 10 using the user ID and password. When the authentication is completed, the service server 1 creates a session (session ID_1) to maintain an online state with the wireless communication terminal 10 (S12). The session ID is used for enabling the server 1 to authenticate the terminal 10 during the data session.

By logging in to the service server 1, the wireless communication terminal 10 can receive login list/state information of other client(s) that log in to the service server 1 using their user ID(s) and password(s). For example, by logging in to the service server 1, the wireless communication terminal 10 can display, through the IM program, a list and a login state of other users (for example, other clients) registered with friends.

At this time, if the computer 20 selects the IM service using the user ID (which is the same as the user ID used in the log-in of the wireless communication terminal 10), the computer 20 executes the IM program and sends the user authentication information such as the user ID and password to the service server 1 to request a login (S14).

As such, the service server 1 performs the authentication procedure using the user ID and password sent from the computer 20. If the authentication is completed, the wireless communication terminal 10 is forced to log out by completing the session (session ID_1) established for its user ID (S16). In addition, the service server 1 creates a session (session ID_2) for the user ID to maintain the online state with the computer 20 (S18).

The service server 1 provides the newly created session (session ID_2) information to the wireless communication terminal 10 (S20). The wireless communication terminal 10 continuously checks whether the newly created session (session ID_2) is completed (or ended) (S22). In other words, the wireless communication terminal 10 periodically or as needed receives session identification information such as the session ID_2 from the service server 1, and checks whether the current session (session ID_2) with the computer 20 is alive. The session preferably means a lasting connection between the server 1 and the computer 20, usually involving the exchange of many packets between the server 1 and the computer 20. The session is typically implemented as a layer in a network protocol.

Upon a receipt of the logout request for the computer 20 (S24), the service server 1 processes the logout of the computer 20 by completing the established session (session ID_2) (S26).

Meanwhile, if the wireless communication terminal 10 determines that the session (session ID_2) with the computer 20 is completed or ended, the wireless communication terminal 10 automatically sends the user authentication information such as the user ID and password to the service server 1 to request a login (S28). The service server 1 authenticates the user ID and password received from the wireless communication terminal 10 in response to the login request, and creates and assigns a session (session ID_3) for the user ID to maintain the online state with the wireless communication terminal 10 (S30).

Likewise, subsequently, the computer 20 may want to log in to the service server 1 again. The computer 20 according to the present invention receives the session ID information used by the terminal 10 from the service server 1. Next, the computer 20 monitors whether the session ID with the terminal 10 is completed. If the session is completed, the computer 20 automatically tries to log in to the service server 1.

Figure 3:
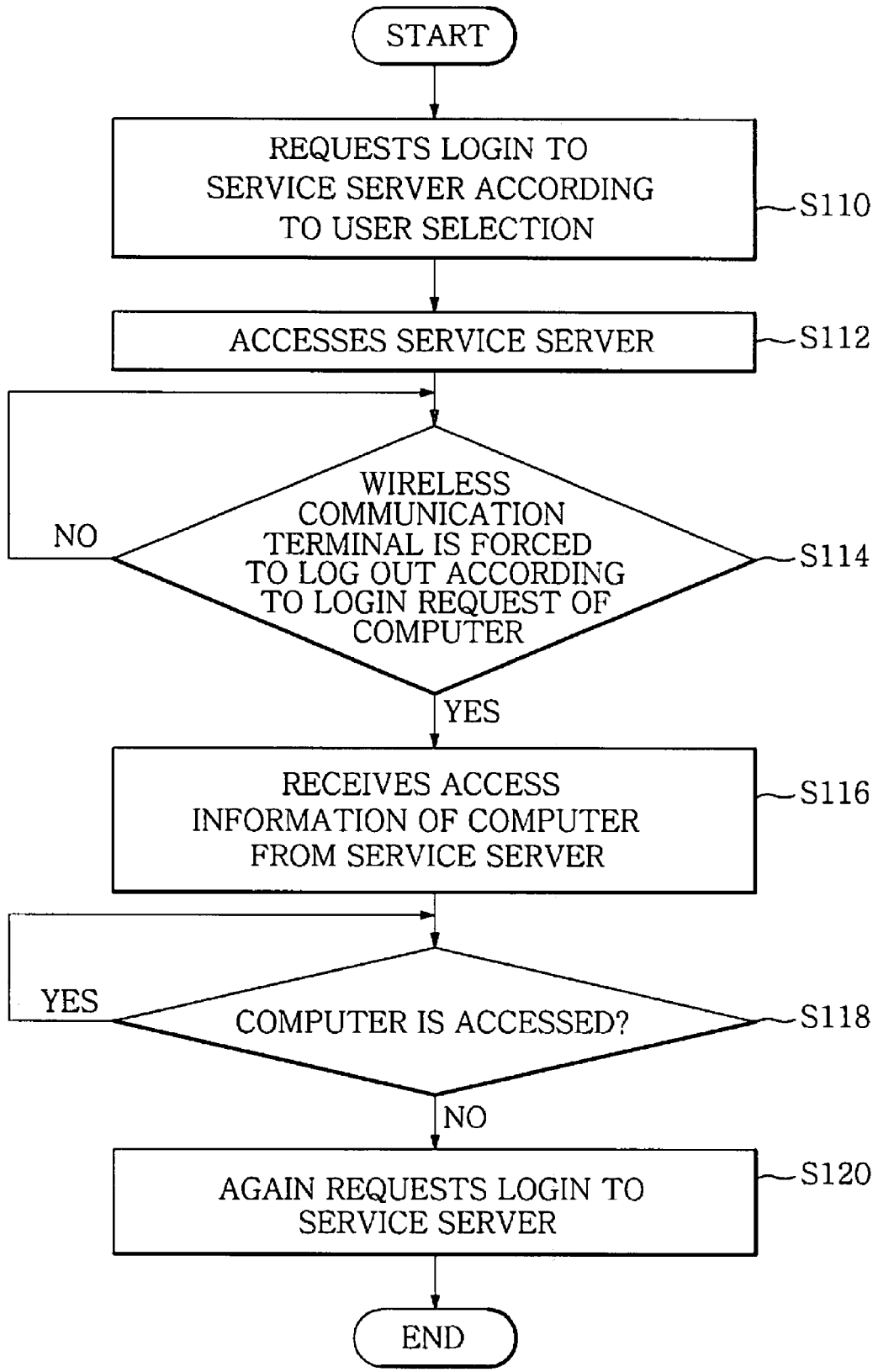
FIG. 3 is a flowchart illustrating the process for enabling the login from the perspective of the wireless communication terminal according to the exemplary embodiment of the present invention.

FIG. 3 is a flowchart illustrating a process for enabling the login for the wireless communication terminal according to the exemplary embodiment of the present invention. This process is implemented in the system of FIG. 1, but can be implemented in other suitable system.

Referring to FIG. 3, according to the user's selection of the IM service, the wireless communication terminal 10 executes the IM program and sends the user authentication information such as the user ID and password of its user to the service server 1 to request the login (S110).

If the login to the service server 1 is successful, the wireless communication terminal 10 establishes and maintains the connection (session) with the service server 1 (S112).

The service server 1 (or the terminal 10) checks whether another client device of the same user (using the same user ID) as the computer 20 requests a login to the service server 1 (S114). If so, the wireless communication terminal 10 is forced to log out, and receives access information of the computer 20 from the service server 1 (S116). The service server 1 mainly uses a SIP protocol. It is desirable that the service server 1 provides the session ID of the session established with the computer 20, to the wireless communication terminal 10 as access information of the computer 20.

Then the wireless communication terminal 10 continuously monitors whether the computer 20 is accessed (i.e., whether the session with the computer 20 is still alive), based on the obtained access information (e.g., the established session ID) of the computer 20 (S118).

If the monitoring indicates that the session with the computer 20 is completed or ended, the mobile communication terminal 10 automatically sends the user authentication information such as the user ID and password to the service server 1 to request a login (S120).

Accordingly, if the IM service is logged out from the computer 20, the wireless communication terminal 10 automatically requests a log-in and automatically logs into the IM service even when the user directly does not enable a login, thereby allowing the IM service to be continuously used.

As described above, if the wireless communication terminal 10 is forced to log out again from the service server 1, according to a login request of other client(s) (for example, computer 20), the wireless communication terminal 10 tries to automatically log in to the service server 1 again by continuously monitoring whether the computer 20 has been logged out.

Figure 4:
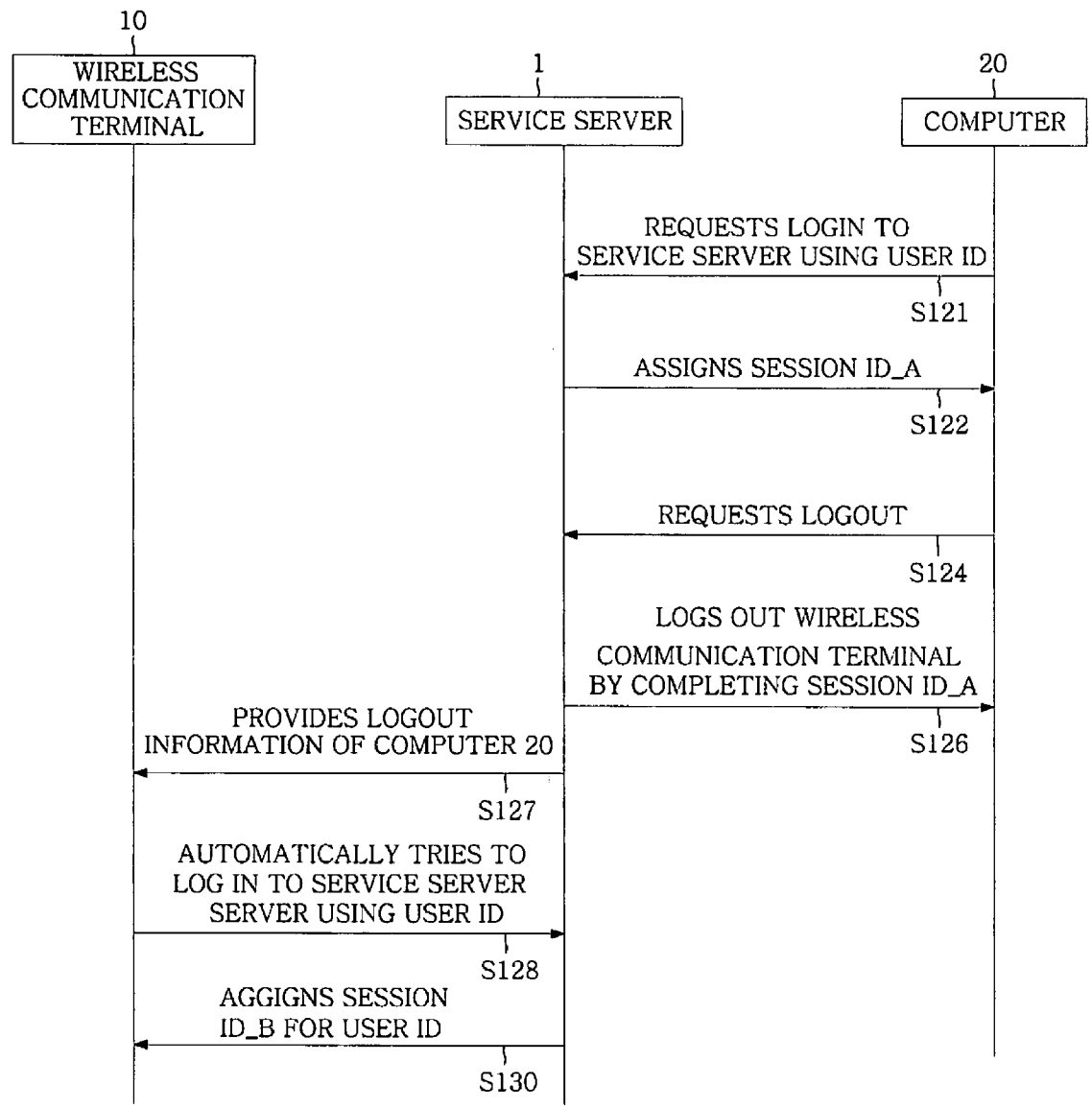
FIG. 4 is a flowchart illustrating a process for enabling a login of a wireless communication terminal according to another exemplary embodiment of the present invention.

FIG. 4 is a flowchart illustrating a process for enabling a login for a wireless communication terminal according to another exemplary embodiment of the present invention. This process is implemented in the system of FIG. 1, but can be implemented in other suitable system. In this embodiment, the log out request from a first client device is received by the service. Then a second client device (having the same user ID) receives the log out information and automatically attempts to log in. That is, a forced logging out may not be present.

Referring to FIG. 4, if the user selects the IM service using the user ID of the user through the computer 20, the computer 20 executes the IM program and sends the user authentication information such as the user ID and password to the service server 1 to request a login (S121).

The service server 1 authenticates the user ID and password of the computer 20, and creates a session (session ID_A) for the user ID to maintain the online state with the computer 20 (S122).

If a logout request is received from the computer 20 (S124), the service server 1 processes the logout request by completing or ending the established session (session ID_A) with the computer 20 (S126).

Meanwhile, the wireless communication terminal 10 receives the logout information (or the access information) of the computer 20 from the service server 1 in a SMS message form or an email message form (S127), and checks whether the computer 20 has been logged out, based on the received logout information. Next, the mobile communication terminal 10 automatically sends the user authentication information such as the same user ID and password (of the user) to the service server 1 to request a login (S128). The service server 1 authenticates the user ID and password received from the wireless communication terminal 10 and creates and assigns the session (session ID_B) for the user ID, to maintain the online state with the mobile communication terminal 10 (S130).

Accordingly, the wireless communication terminal 10 according to this embodiment of the present invention also tries to automatically log in to the service server 1 when the session with the computer 20 has been completed or ended.

The wireless communication terminal 10 according to this embodiment of the present invention receives the logout information from the service server 1 in the SMS message form or the email message form, but is not limited thereto. In other words, the wireless communication terminal 10 may receive the logout information of the computer 20 through a general message server from the computer 20. In addition, the wireless communication terminal 10 checks whether the computer 20 is logged out from the service server 1 based on the received logout information from the computer 20.

In another example, the mobile communication terminal 10 may directly receive the logout information via local area network (LAN) equipment from the computer 20. Accordingly, the mobile communication terminal 10 can check whether the computer 20 has been logged out from the service server 1, based on the logout information received from the computer 20. In order to enable the wireless communication terminal 10 to receive the logout information from the computer 20, the wireless communication terminal 10 and computer 20 may need to have a built-in LAN hardware, for example, a WLAN and a Bluetooth.

Figure 5:
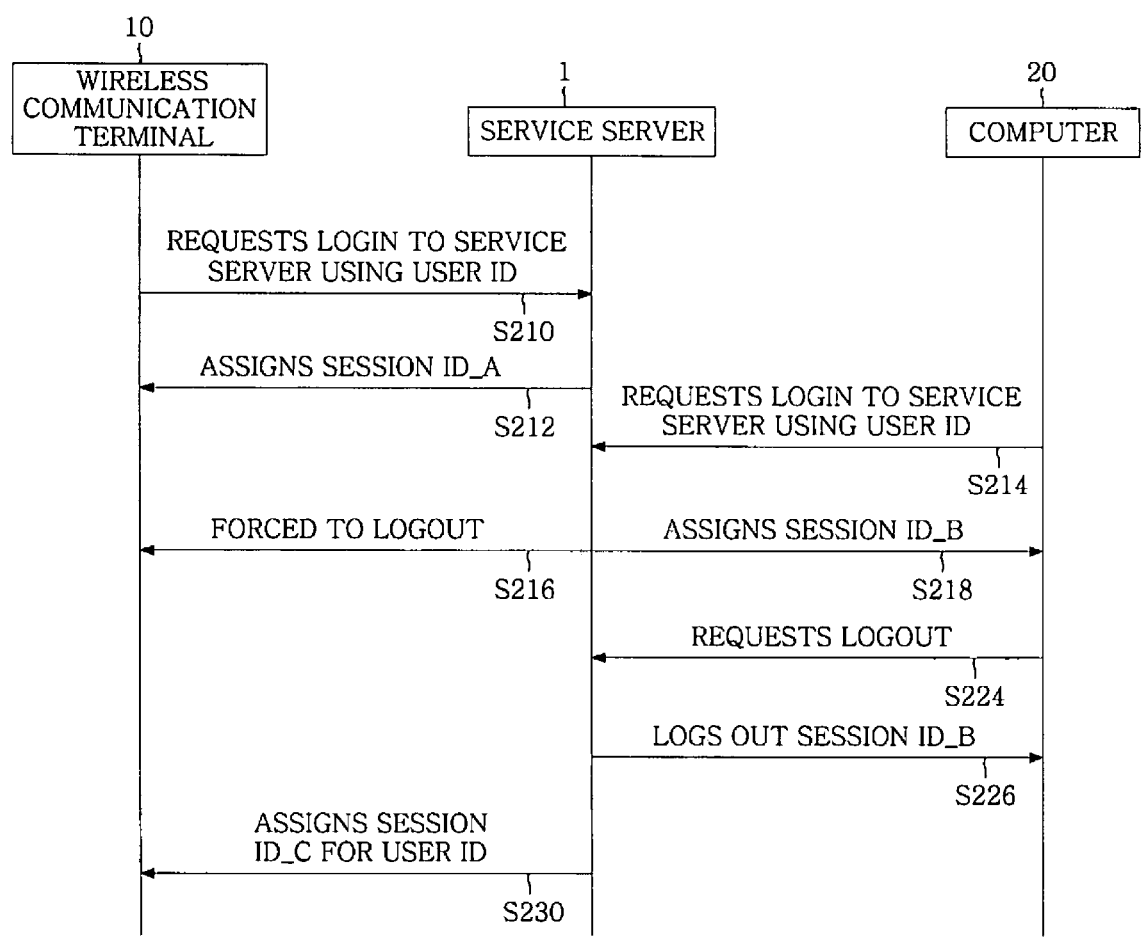
FIG. 5 is a flowchart illustrating a process for enabling a login of a wireless communication terminal according to still another exemplary embodiment of the present invention.

FIG. 5 is a flowchart illustrating a process for enabling a login for a wireless communication terminal according to still another exemplary embodiment of the present invention. This process is implemented in the system of FIG. 1, but can be implemented in other suitable system.

Referring to FIG. 5, according to the user's selection of the IM service, the mobile communication terminal 10 executes the IM program and sends the user authentication information such as its user ID and password to the service server 1 to request a login (S210).

If the service server 1 receives the user ID and password from the mobile communication terminal 10 and completes the authentication, the service server 1 and the mobile communication terminal 10 create a session (session ID_A) for the user ID (S212) and maintains the online state of the session.

If the computer 20 selects the IM service using the same user ID as the wireless communication terminal 10, the computer 20 executes the IM program and sends the user authentication information such as the same user ID and password to the service server 1 to request a login (S214).

In response to the login request for the computer 20, the service server 1 authenticates the user ID and password sent from the computer 20. If the authentication is completed, the wireless communication terminal 10 is forced to log out by completing the established session (session ID_A) for the user ID (S216). Next, the service server 1 creates the session (session ID_B) for the user ID received from the computer 20 and maintains the online state with the computer 20 (S218).

Upon a receipt of the logout request from the computer 20 (S224), the service server 1 processes the logout for the computer 20 by completing the session (session ID_B) (S226).

Meanwhile, once the computer 20 is logged out, the service server 1 automatically authenticates the user ID and password for the terminal 10 without requesting the login from the wireless communication terminal 10, and automatically creates and assigns the session (session ID_C) for the user ID that is created on the basis of a Session Initiation Protocol (SIP), thereby establishing the session with the mobile communication terminal 10 (S230). In other words, once the computer is logged out in step S226, the session ID is automatically assigned to the wireless communication terminal 10 from the server 1 without the terminal 10 requesting a login and/or entering the user ID, password or other authentication data. In this regard, the server 1 may previously store information needed to establish the session with the terminal again and use it. Previously used login information of the terminal 10 may also be stored and used.

Figure 6:
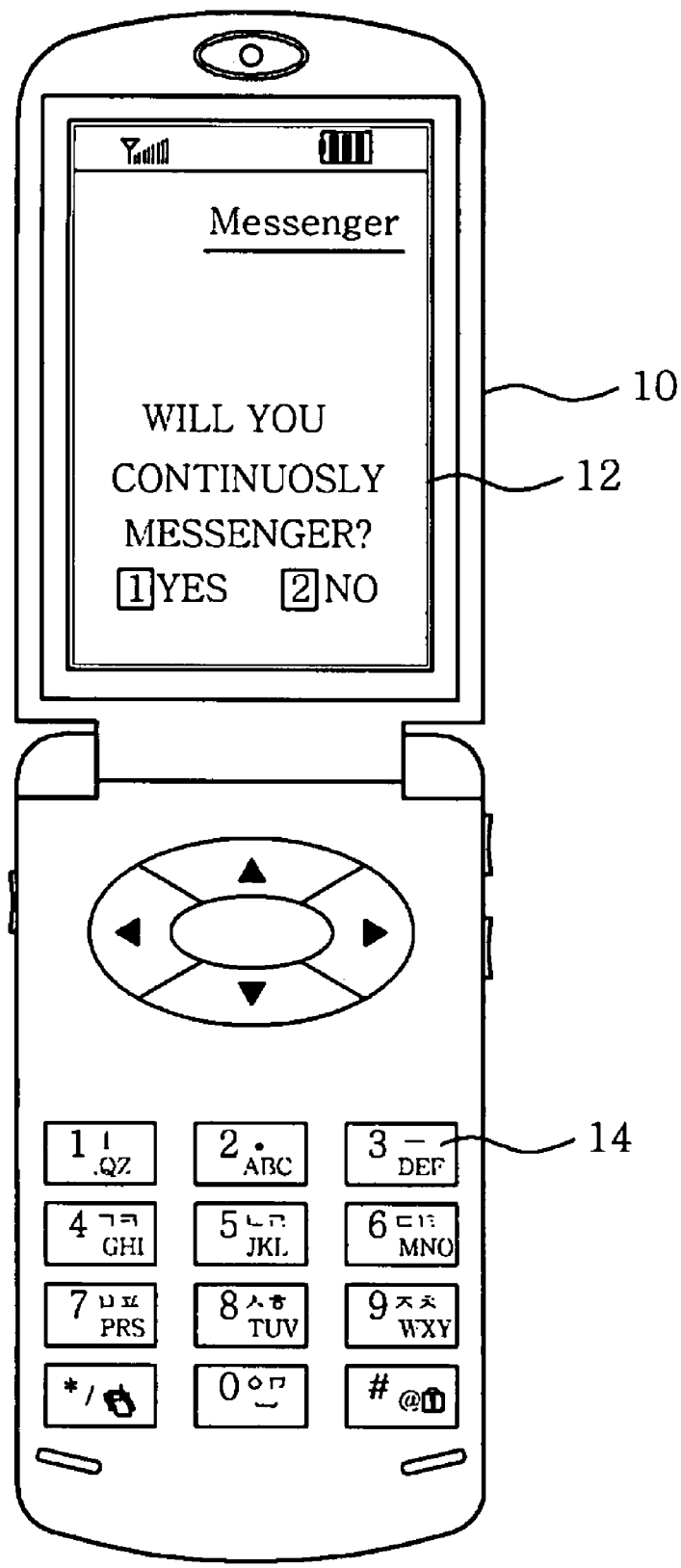
FIG. 6 is a diagram illustrating an example of a wireless communication terminal having a display that displays a user interface according to still another exemplary embodiment of the present invention.

FIG. 6 is a diagram illustrating an example of a display screen of the mobile communication terminal 10 for displaying a user interface according to another exemplary embodiment of the present invention.

According to the previous embodiments of the present invention, the wireless communication terminal 10 is automatically logged in to the service server 1 without displaying a user interface asking whether or not the user wants to log in to the service server 1 again.

In the embodiment of FIG. 6, however, the wireless communication terminal 10 displays a screen 12 asking whether the user wishes to log in to the service server 1 again to continuously use the IM service. As shown in FIG. 6, the wireless communication terminal 10 can display on the screen 12 an option item for selecting "Yes" or "No" together with a sentence such as "will you continuously perform the completed messenger?". The user can select "Yes" using a numeral key "1" of a key button or "No" using the key "2". As a result, when the terminal 10 receives the user's input of "Yes" in this example, the terminal 10 then attempts to automatically log in to the server 1 and thus the user may not need to manually make a plurality of data entries for the login process.

As such, since the terminal 10 provides the screen 12 asking whether the user desires to log in to the server 1 again, the user himself does not need to go through different menus to log in to the server 1.

According to the embodiments of the present invention, it is explained that the service server provides the instant messenger service, but the invention is not limited thereto. The present invention can apply even when two or more wired or wireless terminals are logged in to a WEB server for providing a specific WEB service. For example, if the user uses an internet banking service through the wireless communication terminal by accessing a specific bank's server using authentication information, and then the computer logs in to the bank's server using the same authentication information as the wireless communication terminal, the wireless communication terminal is forced to log out. After that, if the computer is logged out, the wireless communication terminal is again logged in the bank's server automatically or manually, thereby allowing the internet banking service to be continuously used.

According to the above-described process, if the computer is logged out while the user is playing an internet game through the computer, the wireless communication terminal automatically tries to log in to the server, thereby allowing the user to continuously play the internet game using the terminal.

The embodiments of the present invention have been described for illustrative purposes, and those skilled in the art will appreciate that various modifications, additions and substitutions are possible without departing from the scope of the present invention should be defined by the appended claims and their legal equivalents.

What is claimed is:

1. A method for enabling a login in a service server for providing at least one service to a user, the method comprising:
   permitting a login of a first client if the first client requests the login to the service server using user authentication information;
   forcing the first client to log out from the service server if a second client logs in to the service server using the user authentication information;
   sending access information of the second client to the first client so that the first client can monitor whether the second client is logged out from the service server; and
   enabling a re-login of the first client if the second client is logged out from the service server, so as to allow the first client to automatically re-log in to the service server using the user authentication information.

2. The method of claim 1, wherein the access information of the second client includes session identification information (session ID), which is created on the basis of a Session Initiation Protocol (SIP).

3. The method of claim 1, further comprising:
   when the second client logs in to the service server, sending login list/state information of pre-registered clients to the service server.

4. The method of claim 1, wherein the service server provides an instant messenger service.

5. The method of claim 4, wherein the user authentication information includes a user name and a password of the user.

6. The method of claim 1, wherein the service server sends the logout information through a SMS message or an e-mail.

7. The method of claim 1, wherein each of the first and second clients is a personal computer, a handheld computer, a computer notebook, or a mobile terminal.

8. A method for establishing a session in a service server, the method comprising:
   establishing a first session with a first client if the first client logs in to the service server using user authentication information;
   terminating the first session with the first client if a second client logs in to the service server using the user authentication information; and
   automatically establishing a second session with the first client using the user authentication information if the second client is logged out from the service server.

9. The method of claim 8, wherein the first session with the first client is established by enabling session identification information (session ID) created based on a Session Initiation Protocol (SIP) to be assigned to the first client in order to maintain a connection between the service server and the first client.

10. The method of claim 8, further comprising:
    prior to the establishing the second session step, storing the user authentication information in order to establish the second session with the first client.

11. A method for logging in to a service server in a mobile terminal, the method comprising:
    logging in to the service server using authentication information;
    being forced logout from the service server if another device logs in to the service server using the user authentication information;
    receiving login state information of the another device;
    determining whether the another device is logged out from the service server based on the login state information; and
    automatically logging in to the service server using the user authentication information if the another device is logged out from the service server.

12. The method of claim 11, where the login state information includes session identification information (session ID) to be assigned to the other device, which is created on the basis of a Session Initiation Protocol (SIP).

13. The method of claim 12, where the login state information is received from the service server.

14. The method of claim 11, where the login state information is received from the other device through LAN equipment.

15. The method of claim 14, where the LAN equipment is one of a WLAN and a BLUETOOTH.

* * * * *